US006311945B1

(12) United States Patent
D'Angelo

(10) Patent No.: US 6,311,945 B1
(45) Date of Patent: Nov. 6, 2001

(54) PASSIVE VIBRATION ISOLATION DEVICE

(75) Inventor: Stephen D'Angelo, Pacifica, CA (US)

(73) Assignee: Ted Pella, Inc., Redding, CA (US)

( * ) Notice: Subject to any disclaimer, the term of this patent is extended or adjusted under 35 U.S.C. 154(b) by 0 days.

(21) Appl. No.: 09/523,907

(22) Filed: Mar. 13, 2000

Related U.S. Application Data
(60) Provisional application No. 60/125,423, filed on Mar. 22, 1999.

(51) Int. Cl.[7] .................................................. F16M 13/00
(52) U.S. Cl. .......................... 248/632; 248/581; 248/613; 248/611; 248/632; 248/634; 248/621; 267/136
(58) Field of Search ..................................... 248/632, 576, 248/581, 610, 611, 613, 638, 639, 678, 618, 619, 621, 603, 634, 671; 267/136, 153, 141, 293

(56) References Cited

U.S. PATENT DOCUMENTS

| | | | | |
|---|---|---|---|---|
| 600,471 | * | 2/1898 | Yingst ................................. 248/581 |
| 804,884 | * | 11/1905 | Rutan .................................. 248/581 |
| 1,763,682 | * | 6/1930 | Wallace ................................ 248/581 |
| 1,795,313 | * | 2/1931 | Nies .................................... 248/581 |
| 1,943,189 | * | 1/1934 | Rubel ................................... 248/581 |
| 2,014,581 | * | 9/1935 | Norton ................................. 248/581 |
| 2,064,751 | * | 12/1936 | Hussman ............................... 248/21 |
| 3,735,952 | | 5/1973 | Platus et al. ..................... 248/358 R |
| 4,683,520 | | 7/1987 | Grassens et al. ..................... 361/427 |
| 4,713,714 | | 12/1987 | Gatti et al. ........................... 360/137 |
| 4,754,827 | * | 7/1988 | Hirabayashi ......................... 248/638 |
| 4,871,142 | | 10/1989 | deMay, II ........................... 248/632 |
| 5,087,491 | | 2/1992 | Barrett ................................ 428/34.5 |
| 5,178,357 | | 1/1993 | Platus .................................. 248/619 |
| 5,197,707 | | 3/1993 | Kohan ................................. 248/638 |
| 5,240,222 | | 8/1993 | Seeley et al. ........................ 248/638 |
| 5,390,892 | | 2/1995 | Platus .................................. 248/619 |
| 5,595,430 | | 1/1997 | Weyeneth ......................... 312/319.1 |
| 5,645,262 | | 7/1997 | Hamlin ................................ 248/581 |

FOREIGN PATENT DOCUMENTS

0322338 * 12/1929 (GB) .................................. 267/293

* cited by examiner

*Primary Examiner*—Anita King
*Assistant Examiner*—Kimberly Wood
(74) *Attorney, Agent, or Firm*—Flanagan & Flanagan; John R. Flanagan; John K. Flanagan

(57) ABSTRACT

A passive vibration isolation device includes a support frame, an instrument support platform and a plurality of vibration isolators. The support frame is adapted to rest on a support surface. The instrument support platform is adapted to support an instrument thereon. The vibration isolators are spaced apart from one another and disposed between and interconnect the support frame and the instrument support platform such that the instrument support platform is suspended by the vibration isolators in a position spaced from the support frame and above the support surface.

10 Claims, 1 Drawing Sheet

PASSIVE VIBRATION ISOLATION DEVICE

This application claims the benefit of U.S. provisional application No. 60/125,423, filed Mar. 22, 1999.

BACKGROUND OF THE INVENTION

1. Field of the Invention

The present invention generally relates to laboratory instruments and, more particularly, is concerned with a passive vibration isolation device.

2. Description of the Prior Art

Various instruments are employed in laboratory settings and the like. These instruments are often set on the top surfaces of work benches and desks, on floors or in similar locations. Work benches, desks and floors may vibrate for any number of reasons. Certain instruments, such as those used in taking measurements, are sensitive to vibrations. It is well-known to provide means for the isolation of vibrations in conjunction with sensitive instruments. Prior art vibration isolation means include passive devices. Various passive vibration isolation devices have been developed over the years.

Representative examples of prior art passive vibration isolation devices and the like are disclosed in U.S. Pat. Nos. 3,735,952 to Platus et al., 4,683,520 to Grassens et al., 4,713,714 to Gatti et al., 4,871,142 to deMey, II, 5,087,491 to Barrett, 5,178,357 to Platus, 5,197,707 to Kohan, 5,240,222 to Seeley et al., 5,390,892 to Platus, 5,595,430 to Weyeneth and 5,645,262 to Hamlin. While these prior art passive vibration isolation devices appear to be satisfactory for the specific purposes for which they were designed, none of them seem to provide an optimum degree of vibration isolation without adding significant height to the sensitive instrument, associated high costs and sophisticated components.

Consequently, a need remains for a passive vibration isolation device which overcomes the aforementioned problems of the prior art designs without introducing any new problems in place thereof.

SUMMARY OF THE INVENTION

The present invention provides a passive vibration isolation device designed to satisfy the aforementioned need. The passive vibration isolation device of the present invention is for bench and desk top applications and the like. It provides an optimum degree of vibration isolation without adding significant height to any sensitive instrument placed thereon and without associated high costs and sophisticated components of the prior art devices. Such capability solves the aforementioned problems of the prior art designs.

Accordingly, the present invention is directed to a passive vibration isolation device which comprises: (a) a support frame adapted to rest on a support surface; (b) an instrument support platform adapted to support an instrument thereon; and (c) a plurality of vibration isolators spaced apart from one another and disposed between and interconnecting the support frame and the instrument support platform such that the instrument support platform is suspended by the vibration isolators in a position spaced from the support frame and above the support surface.

More particularly, the support frame includes a pair of opposite end members each having a pair of opposite lower vertical portions and an upper horizontal portion extending between and rigidly connected with upper ends of the lower vertical portions so as to provide each opposite end member with an inverted generally U-shaped configuration, the lower vertical portions of each opposite end member at lower ends being adapted to rest on the support surface such that the upper horizontal portions of the opposite end members are spaced above the support surface. The support frame also includes a pair of opposite side members each extending between and rigidly connected at opposite ends to the lower ends of corresponding ones of the lower vertical portions of the opposite end members of the support frame such that the opposite side members are adapted to rest on the support surface adjacent to the lower ends of the lower vertical portions of the opposite end members.

Also, each vibration isolator has an outer tubular sleeve comprised of a yieldable compressible elastomeric material and a pair of internally threaded inner inserts at opposite ends of the outer tubular sleeve adapting the vibration isolators to receive screws in the inner inserts for fastening the instrument support platform to lower ends of the vibration isolators and the vibration isolators, in turn, to the support frame which allows the instrument support platform to float freely below and in equilibrium from the support frame. The vibration isolators may number four.

Further, the instrument support platform has a substantially flat configuration and a pair of opposite end edges, a pair of opposite side edges and spaced upper and lower surfaces. The instrument support platform has a width extending between the opposite side edges thereof being less than the distance extending between the lower vertical portions of each of the opposite end members of the support frame and a length extending between the opposite end edges thereof being greater than the length of one opposite side member of the support frame and a thickness extending between the upper and lower surfaces thereof being less than the height of each of the upper horizontal portions of the opposite end members of the support frame above the support surface such that the instrument support platform is of a size relative to the support frame allowing the instrument support platform to be suspended by the vibration isolators in a position spaced above the support surface with the opposite side edges of the instrument support platform disposed adjacent to and inwardly from the opposite side members of the support frame and the opposite end edges of the instrument support platform disposed between the lower vertical portions and under the upper horizontal portions of the opposite end members of the support frame. The vibration isolators are disposed adjacent to and inwardly from the lower vertical portions of the opposite end members of the support frame and between the opposite end edges of the instrument support platform and the upper horizontal portions of the opposite end members of the support frame.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
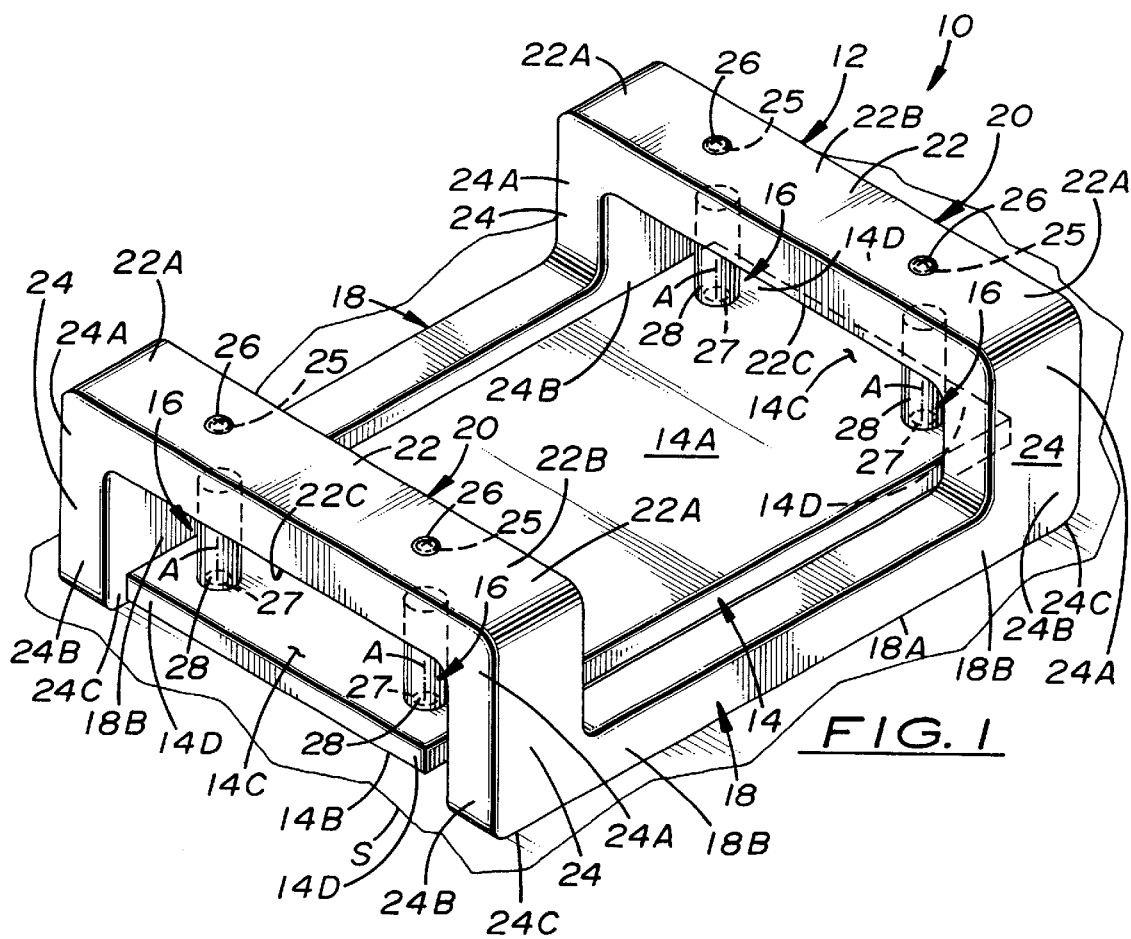
FIG. 1 is perspective view of a passive vibration isolation devise of the present invention.
Figure 2:
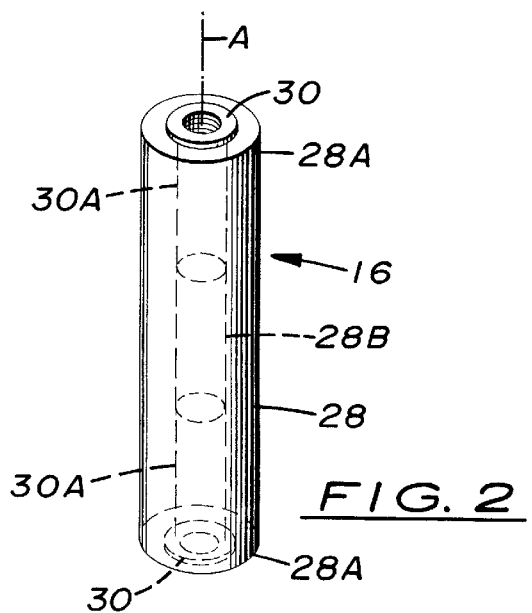
FIG. 2 is an enlarged elevational view of one of a plurality of vibration isolators of the passive vibration isolation device of FIG. 1.

Referring to the drawings and particularly to FIG. 1, there is illustrated a passive vibration isolation device, generally designated 10, of the present invention. The passive vibration isolation device 10 basically includes a support frame 12 adapted to rest on a support surface S, an instrument support platform 14 adapted to support an instrument (not shown) thereon, and a plurality of vibration isolators 16 spaced apart from one another and disposed between and interconnecting the support frame 12 and the instrument support platform 14 such that the instrument support platform 14 is suspended by the vibration isolators 16 in a position spaced from the support frame 12 and above the support surface S, such as a floor or a top surface of a work bench or desk.

The support frame 12 is comprised of a substantially rigid material having sufficient strength to support the suspension of the instrument support platform 14 with an instrument (not shown) placed thereon. The components of the support frame 12 can have a tubular construction being of rectangular cross-section and the support frame 12 can have a substantially rectangular configuration when viewed from above or below, although it may have any other suitable configuration. The support frame 12 preferably has a substantially U-shaped configuration when viewed from a side thereof and a substantially inverted U-shaped configuration when viewed from an end thereof.

More particularly, the support frame 12 has a pair of opposite side members 18 and a pair of opposite end members 20. The side members 18 extend in substantially parallel relation to one another and in substantially perpendicular relation to the end members 20. The end members 20 extend in substantially parallel relation to one another. Each side member 18 has a substantially straight longitudinal configuration and a substantially rectangular transverse configuration. Each side member 18 has substantially the same length, height and width as the other. The side members 18 of the support frame 12 having generally flat bottom surfaces 18A are adapted to rest on the surface S.

Each end member 20 has a substantially inverted U-shaped configuration and includes an upper horizontal portion 22 and a pair of opposite lower vertical portions 24. The upper horizontal portion 22 and lower vertical portions 24 have substantially rectangular transverse configurations. Each upper horizontal portion 22 of the end members 20 has substantially the same length, height and width as the other. Each lower vertical portion 24 of each end member 20 has substantially the same length, height and width as the other lower vertical portion 24 of the end member 20 and as the lower vertical portions 24 of the other end member 20. The upper horizontal portion 22 has opposite ends 22A. Each lower vertical portion 24 has opposite upper and lower ends 24A, 24B. Each opposite end 22A of the upper horizontal portion 22 is connected with an upper end 24A of one of the pair of lower vertical portions 24 of the end member 20. The lower ends 24B of the lower vertical portions 24 of the end members 20 having respective flat bottom surfaces 24C, which are coplanar with the bottom surfaces 18A of the side members 18, are adapted to rest on the surface S. The lower ends 24B of the lower vertical portions 24 of the end members 20 are connected to corresponding ends 18B of the side members 18.

By way of example only, the lengths of the upper horizontal portions 22 of the end members 20 can be less than the lengths of the side members 18 of the support frame 12 and can be greater than the lengths of the lower vertical portions 24 of the end members 20. The heights of the upper horizontal portions 22 of the end members 20 can be about the same as the heights of the side members 18. The widths of the upper horizontal portions 22 of the end members 20 can be substantially the same as the widths of the lower vertical portions 24 of the end members 20 and the widths of the side members 18 of the support frame 12.

The upper horizontal portion 22 of each end member 20 of the support frame 12 has opposite top and bottom surfaces 22B, 22C. The bottom surface 22C of the upper horizontal portion 22 is disposed at a height above the surface S which may be limited to what is sufficient for suspension of the instrument support platform 14 therebelow and above the surface S. The vertical length of each lower vertical portion 24 of the end members 20 is greater than the height of each of the side members 18 of the support frame 12 such that the height of the bottom surface 22C of each upper horizontal portion 22 of the end members 20 above the surface S is greater than the height of one of the side members 18 of the support frame 12. The upper horizontal portions 22 of the end members 20 define pairs of holes 25. The holes 25 are spaced apart from one another. Each hole 25 is spaced from but disposed closer to one of the opposite ends 22A than to the other opposite end 22A of the upper horizontal portion 22. The device 10 also includes a plurality of adjustment fasteners, such as screws 26. The screws 26 preferably number eight, though only four are shown. Each of the four screws 26 is threadably inserted within and extends through one of the holes 25 of the upper horizontal portions 22 of the end members 20.

The instrument support platform 14 is comprised of a substantially rigid material which does not significantly resonate at the frequencies known to interfere with vibration sensitive instruments, such as optical measuring systems, optical microscopes, atomic force microscopes and various other measuring systems. The instrument support platform 14 has a substantially rectangular configuration when viewed from above or below but may have any other suitable configuration preferably matching that of the support frame 12. The instrument support platform 14 has opposite top and bottom surfaces 14A, 14B. The top surface 14A is adapted for receiving and supporting a vibration sensitive instrument (not shown), such as those mentioned above and others, thereon. The bottom surface 14B is spaced above the surface S. The height of the bottom surface 14B above the surface S may be limited to what is sufficient for suspension of the instrument support platform 14 above the surface S and generally does not exceed the height of one of the side members 18 of the support frame 12. The thickness of the instrument support platform 14 is such that its top surface 14A is disposed at a height above the surface S which is approximately the same as or only slightly less or greater than the height of one of the side members 18 of the support frame 12. The instrument support platform 14 has a length slightly greater than the lengths of the side members 18 of the support frame 12 such that opposite ends 14C of the instrument support platform 14 extend below the upper horizontal portions 22 of the end members 20 of the support frame 12. The thickness of the instrument support platform 14 is less than the height of the side members 18 and is less than the vertical lengths of the lower vertical portions 24 of the end members 20 of the support frame 12. The width of the instrument support platform 14 is slightly less than a distance between the opposite side members 18 of the support frame 12. The instrument support platform 14 also has four corners 14D and a plurality of holes 27 defined through the instrument support platform 14 at its corners 14D. The holes 27 are spaced apart from one another and spaced from but disposed adjacent to the respective corners 14D. Four of the screws 26 (not shown) are inserted through the holes 27 of the instrument platform 14. The instrument support platform 14 is of sufficient strength such that it will not significantly deform or deflect with an instrument placed on its top surface 14A.

Each vibration isolator 16 has an outer tubular sleeve 28 and a pair of inner inserts 30 inserted into opposite ends 28A of the outer sleeve 28. The outer tubular sleeve 28 is comprised of a substantially yieldably compressible elastomeric material and has a substantially cylindrical configuration. The outer tubular sleeve 28 defines a central passageway 28B open at the opposite ends 28A. Each insert 30 is comprised of substantially rigid metallic material and has substantially cylindrical configurations. The insert 30 has an outer diameter which is slightly larger than the inner diameter of the outer tubular sleeve 28 or of the passageway 28B thereof for fitting snugly within the central passageway 28B of the outer tubular sleeve 28. Thus, each insert 30 tightly and frictionally fits within one of the opposite ends of the central passageway 28B of the outer tubular sleeve 28 such that the elastomer material of the outer tubular sleeve 28 grips the exterior sidewall 30A of the insert 30. Each insert 30 has a length substantially shorter than the length of the outer tubular sleeve 28 such that a substantial portion of the length of the outer tubular sleeve 28 extends between the opposite inserts 30 allowing the outer tubular sleeve 28 to elongate and compress in absorbing the vibrations. Each insert 30 is internally threaded for threadably receiving one of the screws 26 to secure the outer tubular sleeves 28 of the vibration isolators 16 between the upper horizontal portions 22 of the support frame 12 and the instrument support platform 14.

Each vibration isolator 16 has a central longitudinal axis A along which each vibration isolator 16 is stretchable and retractable. The vibration isolators 16 preferably number four. Each vibration isolator 16 is mounted to and extends between the upper horizontal portion 22 of one of the end members 20 of the support frame 12 and one of the opposite ends 14C of the instrument support platform 14 spaced from but disposed adjacent to one of the corners 14D of the instrument support platform 14 such that the inserts 30 of the vibration isolator 16 are vertically aligned with the respective holes 25, 27 of the upper horizontal portion 22 of the end members 20 and of the instrument support platform 14. The screws 26 can be adjusted for leveling the instrument support platform 14 and thereby for leveling the instrument thereon and for adjusting the height of the bottom surface 14B of the platform 14 above the surface S. The vibration isolators 16 have sufficient resiliency to suspend the instrument support platform 14 and the instrument thereon above the surface S.

The arrangement of the device 10 allows the instrument support platform 14 to float freely in equilibrium from the upper horizontal portions 22 of the end members 20 of the support frame 12. The device 10 generally eliminates vibrations in the range of 5Hz to 125Hz from being transmitted from the surrounding environment to the instrument which is disposed on the top surface 14A of the instrument platform 14. The device 10 may also include one or more bumper members (not shown) comprised of any suitable material to prevent excessive sway of the instrument support platform 14 if the instrument thereon is disturbed. The bumper members may be mounted to the side members 18 or to the end members 20 of the support frame 12 and be disposed adjacent to the instrument support platform 14. The device 10 may further include a bubble level (not shown) of any suitable type to ensure proper leveling of the instrument support platform 14. The bubble level may be mounted to the instrument support platform 14.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A passive vibration isolation device, comprising:
   (a) a support frame adapted to rest on a support surface and including
      (i) a pair of opposite end members each having a pair of opposite lower vertical portions and an upper horizontal portion extending between and rigidly connected with upper ends of said lower vertical portions so as to provide each of said opposite end members with an inverted generally U-shaped configuration, said lower vertical portions of each of said opposite end members at lower ends being adapted to rest on the support surface such that said upper horizontal portions of said opposite end members are spaced above the support surface, and
      (ii) a pair of opposite side members each extending between and rigidly connected at opposite ends to said lower ends of corresponding ones of said lower vertical portions of said opposite end members, said opposite side members being adapted to rest on the support surface adjacent to said lower ends of said lower vertical portions of said opposite end members;
   (b) an instrument support platform adapted to support an instrument thereon; and
   (c) a plurality of vibration isolators spaced apart from one another and disposed between and interconnecting said support frame and said instrument support platform such that said instrument support platform is suspended by said vibration isolators in a position spaced from said support frame and above the support surface.

2. The device of claim 1 wherein said instrument support platform has a substantially flat configuration.

3. The device of claim 1 wherein said instrument support platform has a pair of opposite end edges, a pair of opposite side edges and spaced upper and lower surfaces, said instrument support platform having a width extending between said opposite side edges thereof being less than a distance extending between said lower vertical portions of each of said opposite end members of said support frame and a length extending between said opposite end edges thereof being greater than a length of each of said opposite side members of said support frame and a thickness extending between said upper and lower surfaces thereof being less than a height of each of said upper horizontal portions of said opposite end members of said support frame above the support surface such that said instrument support platform is of a size relative to said support frame allowing said instrument support platform to be positioned above the support surface with said opposite side edges thereof disposed adjacent to and inwardly from said opposite side members of said support frame and said opposite end edges thereof disposed between said lower vertical portions and under said upper horizontal portions of said opposite end members of said support frame.

4. The device of claim 1 wherein said vibration isolators number four.

5. The device of claim 1 wherein each of said vibration isolators has an outer tubular sleeve comprised of a yieldable compressible elastomeric material and a pair of internally threaded inner inserts at opposite ends of said outer tubular sleeve adapting said vibration isolators to receive screws in said inner inserts for fastening said instrument support platform to lower ends of said vibration isolators and said vibration isolators, in turn, to said support frame which allows said instrument support platform to float freely below and in equilibrium from said support frame.

6. The device of claim 1 wherein said vibration isolators are disposed between and interconnect said upper horizontal portions of said opposite end members of said support frame to said instrument support platform.

7. A passive vibration isolation device, comprising:
 (a) a support frame adapted to rest on a support surface and including
  (i) a pair of opposite end members each having a pair of opposite lower vertical portions and an upper horizontal portion extending between and rigidly connected with upper ends of said lower vertical portions so as to provide each of said opposite end members with an inverted generally U-shaped configuration, said lower vertical portions of each of said opposite end member at lower ends being adapted to rest on the support surface such that said upper horizontal portions of said opposite end members are spaced above the support surface, and
  (ii) a pair of opposite side members each extending between and rigidly connected at opposite ends to said lower ends of corresponding ones of said lower vertical portions of said opposite end members, said opposite side members being adapted to rest on the support surface adjacent to said lower ends of said lower vertical portions of said opposite end members;
 (b) an instrument support platform adapted to support an instrument thereon, said instrument support platform having a pair of opposite end edges, a pair of opposite side edges and spaced upper and lower surfaces, said instrument support platform also having a width extending between said opposite side edges thereof being less than a distance extending between said lower vertical portions of each of said opposite end members of said support frame and a length extending between said opposite end edges thereof being greater than a length of one said opposite side member of said support frame and a thickness extending between said upper and lower surfaces thereof being less than a height of each of said upper horizontal portions of said opposite end members of said support frame above the support surface such that said instrument support platform is of a size relative to said support frame allowing said instrument support platform to be positioned above the support surface with said opposite side edges thereof disposed adjacent to and inwardly from said opposite side members of said support frame and said opposite end edges thereof disposed between said lower vertical portions and under said upper horizontal portions of said opposite end members of said support frame; and
 (c) a plurality of vibration isolators spaced apart from one another and disposed between and interconnecting said upper horizontal portions of said opposite end members of said support frame to said opposite end edges of said instrument support platform such that said instrument support platform is suspended by said vibration isolators in a position spaced above the support surface and from said support frame with said opposite side edges of said instrument support platform disposed adjacent to and inwardly from said opposite side members of said support frame and said opposite end edges of said instrument support platform disposed under said upper horizontal portions and between said lower vertical portions of said opposite end members of said support frame.

8. The device of claim 7 wherein said instrument support platform has a substantially flat configuration.

9. The device of claim 7 wherein said vibration isolators number four.

10. The device of claim 7 wherein each of said vibration isolators has an outer tubular sleeve comprised of a yieldable compressible elastomeric material and a pair of internally threaded inner inserts at opposite ends of said outer tubular sleeve adapting said vibration isolators to receive screws in said inner inserts for fastening said instrument support platform to lower ends of said vibration isolators and said vibration isolators, in turn, to undersides of said upper horizontal portions of said opposite end members of said support frame which allows said instrument support platform to float freely below and in equilibrium from said upper horizontal portions of said opposite end members of said support frame.

* * * * *